United States Patent [19]
Martin et al.

[11] Patent Number: 6,098,602
[45] Date of Patent: Aug. 8, 2000

[54] EXHAUST GAS RECIRCULATION SYSTEM

[75] Inventors: Douglas Raymond Martin, Plymouth; Jeffrey Raymond Mohr, Mt. Clemens; Michael John Cullen, Northville; Mrdjan J. Jankovic, Birmingham; Stephen William Magner, Lincoln Park; Giuseppe D. Suffredini, Shelby Township, all of Mich.

[73] Assignee: Ford Global Technologies, Inc., Dearborn, Mich.

[21] Appl. No.: 09/232,900

[22] Filed: Jan. 15, 1999

[51] Int. Cl.$^7$ .......................... F02M 25/07; F02M 47/08
[52] U.S. Cl. ................. 123/568.23; 251/129.11; 701/108
[58] Field of Search ................. 123/568.21, 568.23, 123/568.24, 568.22, 676; 251/129.11; 701/108

[56] References Cited

U.S. PATENT DOCUMENTS

| | | | |
|---|---|---|---|
| 3,969,614 | 7/1976 | Moyer et al. | 235/150.21 |
| 4,142,495 | 3/1979 | Lahiff | 123/119 A |
| 4,433,666 | 2/1984 | Masaki et al. | 123/569 |
| 4,690,120 | 9/1987 | Egle | 168/120 |
| 5,209,212 | 5/1993 | Viess et al. | 123/571 |
| 5,303,168 | 4/1994 | Cullen et al. | 700/299 |
| 5,520,161 | 5/1996 | Klopp | 123/676 |
| 5,537,977 | 7/1996 | Hartman et al. | 123/422 |
| 5,546,915 | 8/1996 | Isobe | 123/570 |
| 5,601,068 | 2/1997 | Nozaki | 123/676 |
| 5,621,167 | 4/1997 | Fang-Cheng | 73/118.1 |
| 5,724,950 | 3/1998 | Shino et al. | 123/676 |

FOREIGN PATENT DOCUMENTS 52-64533  5/1977  Japan .

*Primary Examiner*—Henry C. Yuen
*Assistant Examiner*—Arnold Castro

[57] ABSTRACT

EGR system for an internal combustion engine comprises a stepper motor driven EGR valve (150) to control the rate of exhaust gas recirculation in the engine and an electronic controller (EEC 100) for determining a desired EGR percent mass flow rate as a function comprising a rotational speed value and an aircharge value of the engine, converting the EGR percent mass flow rate to an EGR mass flow rate value, adjusting the EGR mass flow rate value as a function of an exhaust gas temperature value and an absolute exhaust gas backpressure value using MAP values, determining a pressure ratio value across an EGR orifice (155) cooperating with the EGR valve, and determining a required number of motor steps as a function of the adjusted EGR mass flow rate value and the pressure ratio value to achieve the desired EGR percent mass flow rate.

16 Claims, 4 Drawing Sheets

EXHAUST GAS RECIRCULATION SYSTEM

BACKGROUND OF THE INVENTION

1. Field of the Invention

The present invention relates to an exhaust gas recirculation system of an internal combustion engine.

2. Description of Related Art

Internal combustion engines typically include an exhaust gas recirculation (EGR) system to recirculate a controlled portion of the engine exhaust gas into an engine intake manifold in order to provide a reduction in $NO_x$ emissions. Typically, a control mechanism including an EGR valve is provided to vary the EGR rate according to one or more sensed conditions, such as engine temperature, air charge entering the intake manifold, and engine speed. A stepper motor driven EGR valve has been employed in an exhaust gas recirculation system wherein stepper motor steps are calculated primarily as a function of engine speed and air charge. Such control of the stepper motor produces errors in the control of the EGR valve as a result of variations in ambient barometric pressure and temperature.

An object of the present invention is to provide an EGR system with improved control of a stepper motor driven EGR valve

SUMMARY OF THE INVENTION

An embodiment of the present invention provides an EGR system and control method for an internal combustion engine wherein a stepper motor driven EGR valve is controlled by determining a desired EGR mass flow rate value that is equivalent to a desired EGR percent as a function primarily of a rotational speed value and an aircharge value of the engine. A pressure ratio across the EGR valve is determined using a MAP sensor value. The required number of motor steps then is determined as a function of the EGR mass flow rate value and the pressure ratio value to achieve the desired EGR percent.

The EGR mass flow rate preferably is adjusted as a function of an exhaust gas temperature value and a barometric pressure value at which the EGR valve is flowed and by an exhaust gas backpressure value.

The required number of steps for the stepper motor is obtained as a function of the EGR mass flow rate value and pressure ratio value under subsonic exhaust gas flow conditions and as a function of EGR mass flow rate value under sonic exhaust gas flow conditions to achieve the desired EGR percent mass flow rate.

Another embodiment of the invention estimates air charge temperature entering the engine intake manifold on the fresh air side of the engine throttle plate using measured ambient air temperature and/or measured manifold charge temperature downstream of an engine throttle plate depending on the EGR valve position.

DETAILED DESCRIPTION OF THE PREFERRED EMBODIMENT

Figure 1:
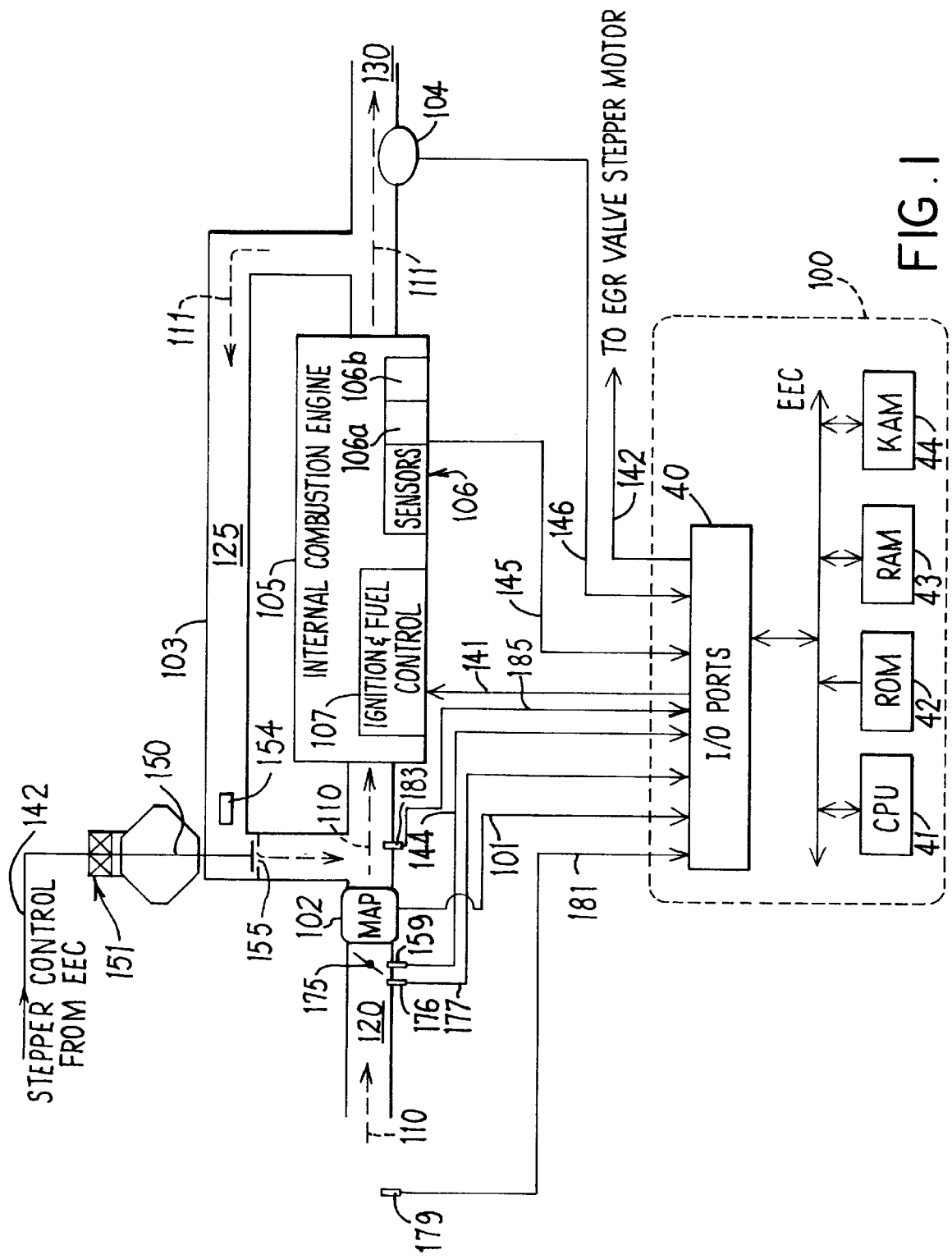
FIG. 1 is block diagram of a portion of an internal combustion engine and electronic engine controller which embodies principles of the invention.

FIG. 1 illustrates an internal combustion engine 105 whose operation is controlled by Electronic Engine Controller (EEC) 100, which includes a central processing unit 41 (CPU), a read-only memory (ROM) 42 for storing control programs, a random-access memory (RAM) 43 for temporary data storage, a keep-alive memory (KAM) 44 for storing learned values, conventional data bus and I/O ports 40 for transmitting and receiving signals to and from the engine. EEC 100 receives signals from a plurality of sensors generally designated 106, including but not limited to, an engine speed sensor and engine circulating coolant temperature sensor designated schematically at 106a and 106b, which transmit signals containing information indicative of the rotational speed of the engine, the temperature of the engine coolant circulating in the engine, and other engine operating parameters to EEC 100 over respective signal lines designated generally as 145. Each of the sensors 106 is conventional and may take one of several known forms. EEC 100 receives signals 145 along with other signals such as signals 144 and 146 described below and generates control signals for controlling spark timing, the rate of fuel delivered to engine combustion chambers and other operational functions of the engine. For example, engine 105 draws an intake air mixture into intake manifold 120 past a manifold absolute pressure (MAP) sensor 102 which transmits a signal 101 indicative of MAP to EEC 100. A throttle position sensor 159 senses the angular position of throttle lever 175 and transmits a throttle position signal 144 indicative of the angular position of throttle lever 175 to EEC 100. Dotted line 110 indicates the flow of the intake charge air entering the intake manifold 120. An air temperature sensor 176 can be used to detect the temperature of the air charge on the fresh air side of the engine throttle plate entering intake manifold 120 and transmits a representative signal 177 to EEC 100. Ambient air temperature sensor 179 is disposed outside the engine air cleaner assembly (not shown) and senses ambient temperature and transmits a representative signal 181 to EEC 100. Manifold charge temperature sensor 183 is disposed in manifold 130 and senses manifold charge temperature, which can include air and EGR gas, between the engine throttle plate and intake valves and transmits signal 185 to EEC 100. Sensors 102, 159, 176, 179, and 183 are each conventional.

Exhaust gas generated from the combustion of an air/fuel mixture within the engine combustion chambers (not shown) travels from the combustion chambers through exhaust manifold 130 as indicated by dotted lines 111. A heated exhaust gas oxygen sensor (HEGO) 104 detects the oxygen content within the exhaust gas and transmits a representative signal 146 to EEC 100.

The engine includes an exhaust gas recirculation (EGR) system for transporting a controlled portion of exhaust gas generated by the engine from an exhaust manifold 130 into the intake manifold 120 via an EGR conduit or passage 125. The amount of exhaust gas which is recirculated from the exhaust manifold to the intake manifold is controlled by a conventional DC stepper motor driven EGR valve 150 having a stepper motor 151 that receives signals 142 from EEC 100 to axially move the valve 150 in incremental steps in a manner to control its position relative to a flow orifice 155 communicating to intake manifold 120. The EGR passage 125 may include an exhaust gas temperature sensor 154 for providing to EEC 100 a signal representative of the temperature of the exhaust gas at (e.g. slightly upstream of) EGR valve 150. Alternately, the exhaust gas temperature may be inferred empirically by EEC 100 from engine speed, aircharge, ignition timing, and air/fuel ratio.

Control of the EGR system is effected as a portion of a background routine executed by the EEC 100 substantially continuously during engine operation in the absence of higher priority interrupt routines. Enablement of the stepper motor driven EGR valve 150 occurs only under engine operation conditions where all of the associated hardware is operating properly. For example, the EGR valve is enabled when the engine is not in a closed throttle mode, not commanded off by torque control strategy and not in a crank mode, and the sensors 102, 106a, 106b, 159, 176 are operating in acceptable manner and generate respective signals.

In enabling the EGR system, if the engine coolant temperature at engine start is less than a calibratable minimum value (e.g. less than 180 degrees F), then the EGR system is ramped on over a calibratable time period, EGRMPT. (e.g. 30 seconds) via a multiplier TESGRE. If the engine coolant temperature at engine start is greater than the calibratable minimum value, then the EGR system is immediately enabled. Implementation of the EGR routine by EEC 100 in this manner is described and shown in FIG. 2 of U.S. Pat. No. 5,515,833 of common assignee herewith, the teachings of which are incorporated herein to this end.

In accordance with an embodiment of the present invention, a desired EGR percent mass flow rate first is determined as a function primarily of a rotational speed value and an aircharge value of the engine adjusted, as necessary, as a function of an engine temperature value and an ambient temperature value. The EGR percent mass flow rate is equal to the EGR mass flow rate (em) divided by the total current engine air mass flow rate (am) plus the EGR mass flow rate (em) multiplied by 100. A variable, egr_rate_des_tmp, is a first value of EGR percent mass flow rate determined by:

$$egr\_rate\_des\_tmp = FNxxx1(n, airchg)*FNxxa(ect)*FNxxb(ambient)*tsegre/EGRMPT, (*=multiply) \quad (1)$$

where FNxxx1(n,airchg) is embodied in a table having input values indicative of engine rotational speed and aircharge expressed as pounds (lbs) air per cylinder filling and output values indicative of EGR percent as illustrated below:

| Aircharge | | | | |
|---|---|---|---|---|
| 0.00020 | 0 | 0 | 0 | 0 |
| 0.00015 | 0 | 5 | 5 | 3 |
| 0.00010 | 5 | 10 | 10 | 5 |
| 0.00005 | 0 | 0 | 0 | 0 |
| | 1000 | 1500 | 2500 | 4000 |
| | R.P.M. | | | |

Figure 2:
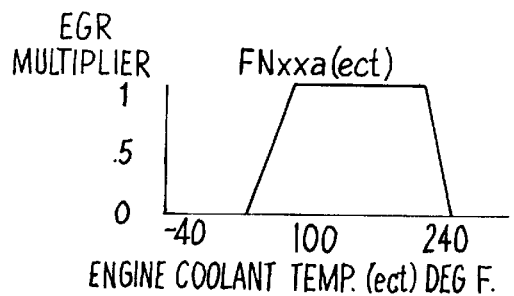
FIGS. 2, 3, 4, 5, 6, 7, 8, 9, 10 and 11 illustrate the functions FNxxa (ect), FNxxb (ambient), FNxxc (pct_load), FNxxd(am)/FNxxg(am), FNxxe(bp),FN_SUBSONIC,FN_EGR_FLOW_CHAR, FN_EGR_FLOW_CHAR_INV, and FNIACT(am).
Figure 3:
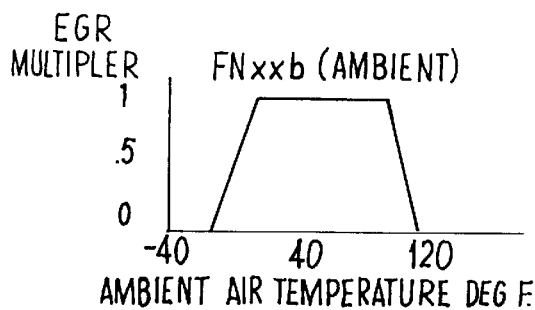

FNxxa(ect) is a function that reduces, as necessary, EGR percent for hot or cold engine coolant temperature as shown for example in FIG. 2. FNxxb(ambient) is a function that reduces, as necessary, EGR percent for hot or cold ambient temperature as shown for example in FIG. 3. tsegre/EGRMPT is ramp function of EGR percent mass flow over time used when the engine coolant temperature at engine start is less than the aforementioned calibratable minimum value and where the EGR system is enabled from a full "off" to full "on" state over the aforementioned ramp period (e.g. 30 seconds).

Figure 4:
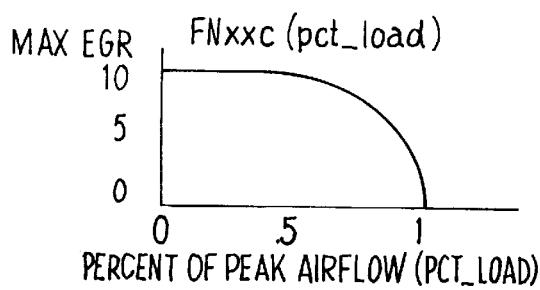

The EEC 100 limits the desired EGR percent mass flow rate, egr_rate_des_, as necessary, at high percent of peak engine airflow in order to restore maximum engine torque as the engine throttle is depressed by:

$$egr\_rate\_des = MIN(egr\_rate\_des\_tmp, FNxxc(pct\_load)) \quad (2)$$

where the egr_rate_des_tmp is limited by the function FNxxc(pct_load) shown, for example, in FIG. 4 to this end. Pct_load is percent of peak air flow as a ratio of current MAP divided by estimate of peak MAP at wide open throttle at current engine speed and barometric pressure and is determined by:

$$pct\_load = MAP/[bp-FNxxg(am)*29.92/bp*sqrt((act+460)/560))] \quad (3)$$

where MAP is manifold absolute pressure, bp is measured or estimated barometric pressure as described in U.S. Pat. No. 5,136,517, the teachings of which are incorporated here in by reference, FNxxg(am) is a measured pressure drop, PD, across the throttle and air cleaner assembly at wide open throttle at standard barometric pressure, FIG. 6, (act+460)/560 is air charge temperature, act, on the fresh air side of the engine throttle plate corrected for deviation from a standard temperature, such as 100 degrees F (or 560 degrees Rankin), and sqrt is square root. The air charge temperature, act, can be inferred in the manner described below under heading act estimation when act sensor 176 is not present.

The EGR percent mass flow rate, egr_rate_des, then is converted into an equivalent EGR mass flow rate value (lbs/minute), desem, based on total charge, total_charge, to the engine cylinders, ampem, which is equal to current engine air mass flow rate (am) plus the current EGR mass flow rate (em) and estimated from a total charge calculation described for a MAP sensor-based system in copending application Ser. No. 09/005,927 filed Jan. 12, 1998, or preferably in copending application entitled "Method Of Estimating Engine Charge" (Attorney Docket No. 198-1368) [where ampem=total_charge*engine_speed*number_of_cylinders/2] filed of even date herewith, both of common assignee and the teachings of both of which are incorporated herein by reference. The value of desem is determined as follows:

$$desem = egr\_rate\_des*ampem/100, \quad (4)$$

Figure 5:
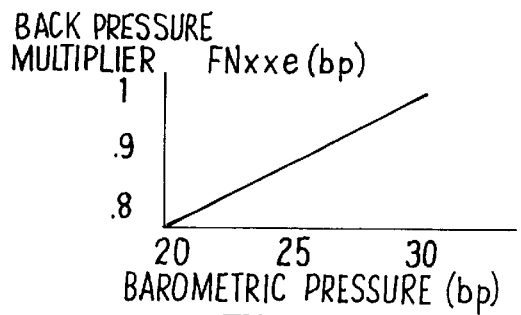
Figure 6:
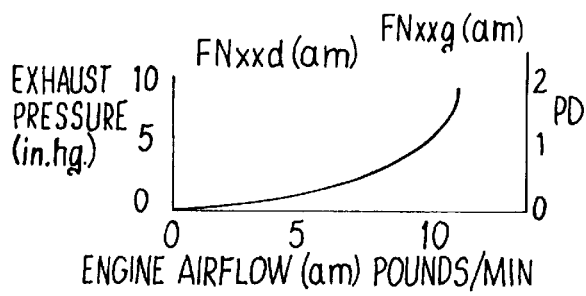

The EGR mass flow rate value, desem, is adjusted as a function of measured or estimated exhaust gas temperature value and an estimated absolute exhaust gas backpressure value at which EGR valve 150 is flowed in engine dynamometer tests by:

estimating absolute exhaust gas backpressure, pexhaust_abs, by:

$$pexhaust\_abs = bp + pexhaust \quad (5)$$

where bp is barometric pressure and pexhaust is the estimated gage exhaust gas backpressure determined by:

$$pexhaust = FNxxd(am)*29.92/FNxxe(bp) \quad (6)$$

where functions FNxxe(bp) and FNxxd(am) are shown in FIGS. 5 and 6, and calculating an EGR flow absolute exhaust gas backpressure/exhaust gas temperature correction, cf, by:

$$cf = (pexhaust\_abs/29.92)*sqrt(1460/(extEGR+1000)) \quad (7)$$

where sqrt is square root and extEGR is exhaust gas temperature at EGR orifice 155 as measured by sensor 154 or estimated as described in copending application entitled "Exhaust Gas Temperature Estimation" (Attorney Docket No. 198-0896) filed of even date herewith and of common assignee, the teachings of which are incorporated herein by reference, and adjusting the EGR mass flow rate value, desem, to the absolute exhaust gas backpressure and pressure/ exhaust gas temperature conditions that existed when EGR valve 150 was characterized (flowed) in engine dynamometer tests by:

$$desem\_corr = desem/cf. \quad (8)$$

The required number of steps of stepper motor 151 to achieve the desired EGR percent then is determined as a function of the adjusted EGR mass flow rate value, desem_corr, and a pressure ratio value, egr_pres_rat, existing across the EGR valve. For example, the pressure ratio across EGR orifice 155 is first determined by:

$$egr\_pres\_rat = MAP/(pexhaust\_abs) \quad (9)$$

The required number of motor steps to achieve a desired EGR percentage is obtained by EEC 100 by looking up motor output step values from EGR mass flow table FN_EGRPOS, e.g. see exemplary table set forth below where egr_pres_rat is on the abscissa and egr_mass (EGR mass flow in lbs/minute) is on the ordinate with the table output being motor position steps, by:

$$egr\_step\_desired\_tmp = FN\_EGRPOS(egr\_res\_rat, desem\_corr) \quad (10)$$

The table values are determined empirically by dynamometer engine tests. Table FN_EGRPOS is the inverse of table FN_EGRMAS also appearing below. In the tables, pressure ratio values below 0.528 correspond to sonic exhaust gas flow conditions past the EGR valve 150, whereas pressure ratio values above 0.528 correspond to subsonic exhaust gas flow conditions past the EGR orifice 155. In the tables, the output values of step positions for table FN_EGRPOS and EGR mass flow rate values for table FN_EGRMAS do not change for pressure ratio values of 0.528 and below corresponding to sonic exhaust gas flow conditions. On the other hand, the step positions and EGR mass flow vary in the respective tables for pressure ratio conditions above 0.528 corresponding to subsonic exhaust gas flow conditions. Thus, the required number of steps for the stepper motor 151 is obtained as a function of the corrected EGR mass flow value (e.g. desem_corr) and pressure ratio value from table FN_EGRPOS under sonic and subsonic conditions.

The output of the table is clipped, as necessary, to a maximum value corresponding to the total steps of the motor 151; e.g. 52 steps, for example, by:

$$egr\_step\_desired = MIN(egr\_step\_desired\_tmp, 52) \quad (11)$$

| Output of table is<br>EGR position (steps) | | | | | | Output of table is<br>EGR mass (lbs/min) | | | | |
|---|---|---|---|---|---|---|---|---|---|---|
| 0.6 | 52 | 52 | 52 | 52 | 52 | 52 | 0.6 | 0.6 | 0.6 | 0.3 | 0 |
| 0.4 | 30 | 30 | 30 | 52 | 52 | 40 | 0.5 | 0.5 | 0.5 | 0.25 | 0 |
| 0.3 | 23 | 23 | 23 | 52 | 52 | 30 | 0.4 | 0.4 | 0.4 | 0.2 | 0 |
| 0.2 | 18 | 18 | 18 | 30 | 52 | 20 | 0.25 | 0.25 | 0.25 | 0.15 | 0 |
| 0.1 | 10 | 10 | 10 | 18 | 52 | 10 | 0.1 | 0.1 | 0.1 | 0.06 | 0 |
| 0 | 0 | 0 | 0 | 0 | 0 | 5 | 0 | 0 | 0 | 0 | 0 |
|  | 0 | 0.25 | 0.5 | 0.75 | 0 |  | 0 | 0.25 | 0.5 | 0.75 | 1 |
|  |  | FN_EGRPOS | | | |  |  | FN_EGRMAS | | | |

EEC 100 controls the stepper motor 151 pursuant to the number of steps determined in the manner described above to provide improved control of the desired EGR percent. The EEC 100 also conducts a running calculation of the actual EGR mass flow rate value, egr_rate_actual_tmp, given the actual temporary EGR stepper motor position, egr_step_actual, which may not be equal to egr_step_desired due to potential EGR system failure or unachievable modes (e.g. unachievable EGR percent mass flow rate at high altitude) and stepper motor/valve dynamics (slewing effects). For example, such calculation of the actual EGR mass flow rate given the actual EGR stepper motor position is determined by:

$$em = FN\_EGRMASS(egr\_pres\_rat, egr\_step\_actual) * cf \quad (12)$$

$$egr\_rate\_actual\_tmp = (em/ampem) * 100 \quad (13)$$

where the FN_EGRMASS table is set forth above with egr_pres_rat on the abscissa, egr_step_actual on the ordinate and the output of the table being EGR mass flow (lbs/minute). The egr_rate_actual_tmp is subjected to exponential smoothing or rolling average by:

$$fk\_eact = 1/(1 + TCEACT/bg\_tmr) \quad (14)$$

where fk_eact is a filter constant, TCEACT is a calibration time constant (e.g. 0.2), and bg_tmr is time between successive computer calculations (e.g. 0.1 seconds) of egr_rate_actual_tmp to yield:

$$egr\_rate\_act = fk\_eact * egr\_rate\_act\_tmp + (1 - fk\_eact) * egr\_rate\_act \quad (15)$$

where egr_rate_act represents a previous egr_rate_act value determined in the immediately previous loop calculation using this equation. The calculated egr_rate_act is used by EEC 100 to optimize engine ignition timing, air mass flow, and other operating variables.

In the embodiment of the invention described above, EGR mass flow rate at standard temperature and pressure is modeled versus EGR pressure ratio and EGR valve position in steps in tables FN_EGRPOS and FN_EGRMASS. Another embodiment of the invention replaces the tables with certain functions for potential saving in required memory space and calibration effort.

Figure 7:
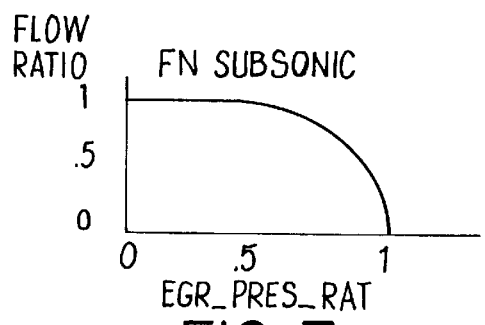

For example, in this embodiment, the ratio of actual EGR flow to the EGR flow (flow_ratio) at low (subsonic) pressure ratio across the valve 150 is determined as follows:

$$flow\_ratio = FN\_SUBSONIC(egr\_pres\_rat) \quad (16)$$

where the FN_SUBSONIC function is determined empirically and illustrated in FIG. 7.

The desired EGR mass flow, desem, is adjusted for this effect as well as for above correction factor, cf, for differences in valve flow temperature and pressure used in the above embodiment by:

$$desem\_corr = (desem/cf)/flow\_ratio \quad (17)$$

Figure 8:
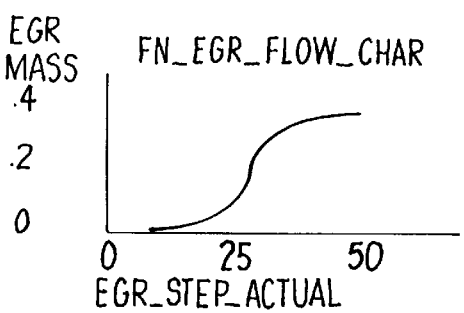
Figure 9:
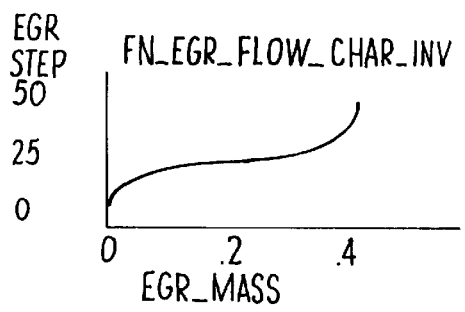

The required number of EGR motor steps to achieve the EGR mass flow rate then is calculated or determined by:

$$egr\_step\_desired\_tmp = FN\_EGR\_FLOW\_CHAR\_INV(egr\_pres\_rat, desem\_corr) \quad (18)$$

where the FN_EGR_FLOW_CHAR_INV function is determined empirically as a function of the EGR mass flow rate value and pressure ratio value under subsonic exhaust gas flow conditions and as a function of EGR mass flow rate under sonic exhaust gas flow conditions to achieve the desired EGR percent and is shown in FIG. 9, which is the inverse of FIG. 8.

Another alternative embodiment of the invention involves a different calculation of the EGR mass flow rate value, em, used above in calculating actual EGR mass flow at the actual EGR position. In this embodiment, the effect on em by flow ratio effects at low (subsonic) pressure ratios is determined by:

$$\text{flow\_ratio} = FN\_SUBSONIC(egr\_pres\_rat) \qquad (19)$$

$$egr\_flow\_sonic = FN\_EGR\_FLOW\_CHAR(egr\_step\_actual), \qquad \text{FIG. 8 (20)}$$

$$em = egr\_flow\_sonic * flow\_ratio * cf \qquad (21)$$

act estimation

The following describes estimation of act and the various RAM and ROM variables employed to this end.

RAM variable description (RAM 43):

aatemp=ambient air temperature, Deg. F. (Sensor 179)

act=temperature measured on fresh air side of throttle plate, Deg. F.

inf_act=inferred version of act, Deg. F.

mct=measured manifold charge temperature which could include air and EGR, measured between throttle plate and intake valves, Deg. F. (Sensor 183)

am=air mass flow in lbs/min bg_tmr=time since last loop through this particular computer code eng_off_tmr=time between when vehicle was turned off and when it was turned on again.

amb_adj=estimated difference between ambient air temperature and act, Deg. F.

iact_egrbar=filtered EGR percent, percent value

ROM variable description (ROM 42):

TC_IACT_SOAK=time constant for rate at which act approaches mct after an engine is turned off, seconds, typical value=10 minutes IACTEGRLIM=EGR rate below which mct provides good information about act, percent value, typical value=2 percent FNIACT(am)=one-dimensional table of values representing a weighting factor between ambient air temperature and mct used as estimate of act. Note, act is always greater than ambient air temperature and less than manifold charge temperature. Deg. F., See typical values in FIG. 10.

AMB_DELTA=typical difference between ambient air temperature and act at part throttle conditions with the air conditioner off. Typical value=10 Deg. F.

AMB_ACC_DELTA=additional difference between ambient air temperature and act at part throttle conditions with the air conditioner on. Typical value=10 Deg. F.

TC_IACT=time constant for inferred act. Typical value=5 sec.

TC_EGRBAR=time constant EGR rate. Typical value=1 second.

Algorithm

The following logic is used when both ambient air temperature (sensor 179) and manifold charge temperature (sensor 183) are available. The algorithm takes advantage of the fact that the temperature to be inferred, inf_act, is downstream of the ambient air temperature, aatemp, and upstream of the manifold charge temperature, mct. These sensors thus provide bounds for the value to be inferred. The process is complicated by the fact that when EGR is introduced into the intake manifold it causes mct to increase markedly. In such cases, an alternate algorithm is used relying strictly on aatemp. Fortunately, EGR is used in non-idle conditions only, and in such conditions act is related to aatemp in a straightforward manner.

Figure 11:
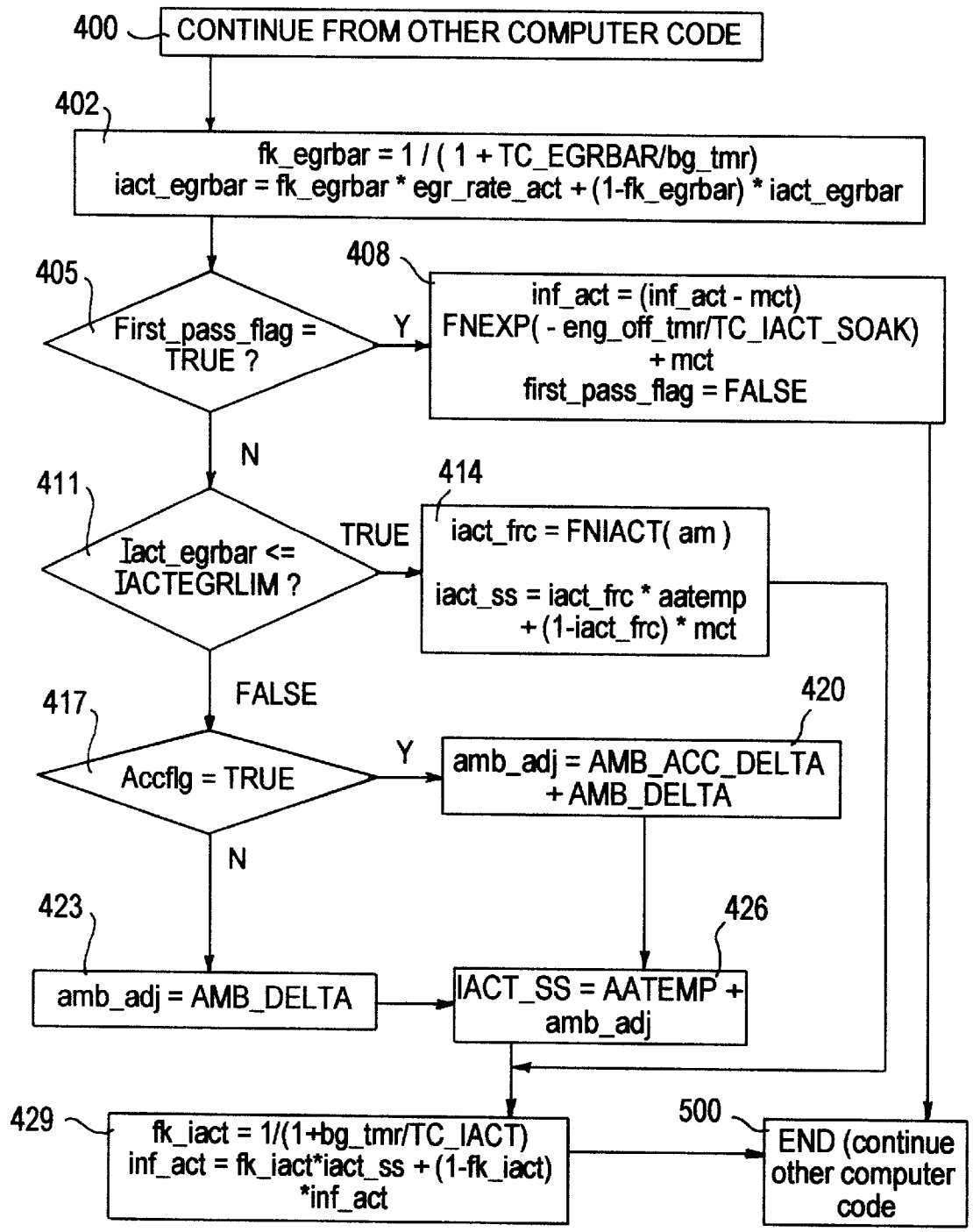

Referring to the flowchart in FIG. 11. At step 400, logic continues from other engine computer code not shown. At step 402 the actual EGR percent, egr_rate_act, is filtered to determine if EGR is zero, and if it has been zero for a sufficiently long time to minimize its temperature effect on mct. To calculate the filter, a calibratable time constant, TC_EGRBAR, is converted to a filter constant fk_egrbar knowing the computer loop time bg_tmr. The filtered EGR percent, iact_egrbar, is in turn a function of the filter constant, the new value of egr, egr_rate_act, and the filtered value, iact_egrbar, from the previous computer loop.

At step 405, it is determined whether this is the first pass through the computer logic as indicated by first_pass_flag. If yes, logic flows to step 408 where a formula is used to exponentially decay inf_act to the measured mct value over the time since the engine was turned off (soak time). FNEXP is a function which takes an exponential of its argument, and TC_IACT_SOAK is a calibratable time constant governing the cooling off of the act sensor during a soak. The first_pass_flag is then set to FALSE so this logic is not executed until the next engine start when the flag is initialized to TRUE by logic not shown Logic then flows to the END step 500.

Figure 10:
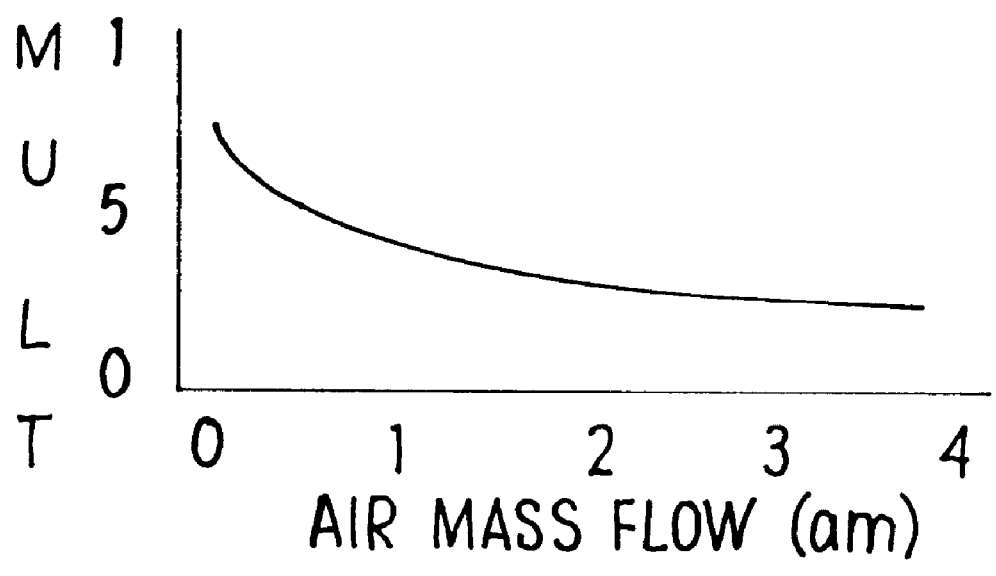

If the evaluation in step 405 is false, logic flows to step 411 where the filtered EGR level is compared to a calibratable constant, IACTEGRLIM, usually set to near zero. If this evaluation is true, then logic flow continues to step 414 where the steady-state inferred act, iact_ss, is calculated from the calibration table FNIACT(am), mct, and aatemp where FNIACT(am)=iact_frc. Typical values of FNIACT (am) are shown in FIG. 10 plotted as MULT versus air mass flow. Logic then flows to step 429.

If the evaluation in step 411 is FALSE, then logic flows to step 417 where the status of the air conditioning clutch, accflg, is checked. The air conditioner heat exchanger puts heat into the engine compartment and greatly effects the rise in heat from the ambient temperature to the inferred act position.

If the evaluation in step 417 is TRUE, logic flows to step 420 where the variable amb_adj is calculated as the sum of a calibratable delta due to air conditioning, AMB_ACC_DELTA, plus an additional calibratable delta for the no air conditioning condition AMB_DELTA. Logic then flows to step 426 where a steady-state inferred ambient temperature, iact_ss, is calculated from the ambient air temperature sensor and the calculated adjustment.

If the evaluation in step 417 is FALSE, logic flows to step 423 where the delta is calculated from the calibratable no air conditioning delta, AMB_DELTA, alone. Logic then flows to step 426.

In step 426 the steady-state inferred act is calculated from the ambient temperature sensor and the ambient adjustment from step 420 or step 423. Logic then flows to step 429.

In step 429 a filter constant, fk_act, is calculated from a calibratable time constant, TC_IACT, which governs changes in inferred act, and the computer loop time bg_tmr. Finally, inferred act, inf_act, is calculated from the filter constant, the new steady-state estimate iact_ss, and the previous value of inf_act. Logic then flows to step 500 where inf_act is used by other computer algorithms including the estimate of air charge in co-pending application entitled "Method of Estimating Engine Change" (Attorney Docket No. 198-1368) filed of even date herewith and of common assignee herewith.

While the invention is described above in terms of specific embodiments, it is not intended to be limited thereto but rather only to the extent set forth in the following claims.

What is claimed is:

1. Method of controlling a stepper motor driven EGR valve to control the rate of exhaust gas recirculation in an internal combustion engine, comprising determining a desired EGR mass flow rate value that is equivalent to a desired EGR percent mass flow rate value as a function comprising a rotational speed value and an air-charge value of said engine, determining a pressure ratio value across an EGR orifice controlled by said valve, and determining a required number of steps for said stepper motor as a function of said EGR mass flow rate value and said pressure ratio value to achieve the desired EGR percent mass flow rate value.

2. The method of claim 1 including adjusting said EGR mass flow rate value as a function of an exhaust gas temperature value and an absolute exhaust gas backpressure value.

3. The method of claim 1 wherein said pressure ratio value is determined by dividing a manifold absolute pressure value by an absolute exhaust gas backpressure value.

4. Method of controlling a stepper motor driven EGR valve to control the rate of exhaust gas recirculation in an internal combustion engine, comprising determining a desired EGR mass flow rate value that is equivalent to a desired EGR percent mass flow rate value as a function comprising a rotational speed value and an air-charge value of said engine, determining a pressure ratio value across an EGR orifice associated with said valve, and determining a required number of steps for said stepper motor as a function of said EGR mass flow rate value and said pressure ratio value under subsonic exhaust gas flow conditions and as function of said EGR mass flow rate value under sonic exhaust gas flow conditions to achieve the desired EGR percent mass flow rate value.

5. The method of claim 4 wherein said required number of steps for said stepper motor is obtained from a table having inputs comprising pressure ratio values and EGR mass flow rate values and having an output comprising motor step values to achieve said desired EGR percent value.

6. Method of controlling a stepper motor driven EGR valve to control the rate of exhaust gas recirculation in an internal combustion engine, comprising determining a desired EGR mass flow rate value that is equivalent to a desired EGR percent mass flow rate value as a function comprising a rotational speed value and an air-charge value of said engine, determining a pressure ratio value across an EGR orifice associated with said valve, determining a required number of steps for said stepper motor as a function of said EGR mass flow rate value and said pressure ratio value to achieve the desired EGR percent mass flow rate value, and limiting said EGR percent mass flow rate value as a function of manifold absolute pressure as it approaches a peak manifold absolute pressure value at a current engine speed, said function being expressed as $$pct\_load = MAP/[bp - FNxxg(am)*29.92/bp*sqrt((act+460)/560))]$$

where pct_load is percent of peak air flow, MAP is an absolute manifold pressure value, bp is a baormetric pressure value, FNxxg(am) is a pressure drop function across a throttle and air cleaner assembly at wide open throttle at standard barometric pressure, sqrt is a square root, act is an air charge temperature value on a fresh air side of an engine throttle plate.

7. EGR system for an internal combustion engine, comprising a stepper motor driven EGR valve to control the rate of exhaust gas recirculation in said engine and an electroniccontroller programmed to determine a desired EGR mass flow rate value that is equivalent to a desired EGR percent mass flow rate value as a function comprising a rotational speed value and an air-charge value of said engine, determining a pressure ratio value across an EGR orifice controlled by said EGR valve, and determining a required number of steps for said stepper motor as a function of said EGR mass flow rate value and said pressure ratio value to achieve the desired EGR percent mass flow rate value.

8. The system of claim 7 wherein said controller adjusts said EGR mass flow rate value as a function of an exhaust gas temperature value and an absolute exhaust gas backpressure value.

9. The system of claim 8 further including a manifold absolute pressure sensor, said controller determining said pressure ratio value by dividing a manifold absolute pressure value of said sensor by an absolute exhaust gas backpressure value.

10. EGR system for an internal combustion engine, comprising a stepper motor driven EGR valve to control the rate of exhaust gas recirculation in said engine and an electronic controller programmed to determine a desired EGR mass flow rate value that is equivalent to a desired EGR percent mass flow rate value as a function comprising a rotational speed value and an air-charge value of said engine, determining a pressure ratio value across an EGR orifice associated with said valve, and determining a required number of steps for said stepper motor as a function of said EGR mass flow rate value and said pressure ratio value under subsonic exhaust gas flow conditions and as function of said EGR mass flow rate value under sonic exhaust gas flow conditions to achieve the desired EGR percent mass flow rate value.

11. Method of estimating air-charge temperature to an intake manifold of an internal combustion engine having an exhaust gas recirculation system with an EGR valve, comprising:

a) determining a manifold charge temperature value using a temperature sensor in said intake manifold, b) determining an ambient air temperature value using a temperature sensor located external of an air cleaner assembly of said engine, c) estimating said air-charge temperature from at least one of the ambient air temperature value and the manifold charge temperature value depending on position of said EGR valve.

12. The method of claim 11 wherein said air-charge temperature is estimated from the manifold charge temperature value when said EGR valve is open.

13. The method of claim 11 wherein said air-charge temperature is estimated as a function of a weighting factor between the ambient air temperature value and the manifold charge temperature value when said EGR valve is closed.

14. EGR system having an EGR valve for an internal combustion engine, comprising a) a temperature sensor in an intake manifold of said engine for determining a manifold charge temperature value, b) a temperature sensor located external of an air cleaner assembly of said engine for determining an ambient air temperature value, c) an electronic controller programmed to estimate an air-charge temperature from at least one of the ambient air temperature value and the manifold charge temperature value depending on position of said EGR valve.

15. The system of claim 14 wherein said controller is programmed to estimate said air charge temperature from the manifold charge temperature value when said EGR valve is open.

16. The system of claim 14 wherein said controller is programmed to estimate said air charge temperature as a function of a weighting factor between the ambient air temperature value and the manifold charge temperature value when said EGR valve is closed.

* * * * *

UNITED STATES PATENT AND TRADEMARK OFFICE
CERTIFICATE OF CORRECTION

PATENT NO : 6,098,602

DATED : August 8, 2000

INVENTOR(S): Douglas R. MARTIN et al.

It is certified that error appears in the above-identified patent and that said Letters Patent is hereby corrected as shown below:

Col. 4, line 30; after "1368)" insert ---, U.S. Serial No. 09/232,297 filed January 15, 1999,---.

Col. 4, line 63; after "198-0896" insert ---, U.S. Serial No. 09/232,883,---.

Col. 10, line 54; change "air charge" to ---air-charge---.

Col. 10, line 58; change "air charge" to ---air-charge---.

Signed and Sealed this

Twenty-second Day of May, 2001

*Attest:*

NICHOLAS P. GODICI

*Attesting Officer*  *Acting Director of the United States Patent and Trademark Office*